Figure 21:
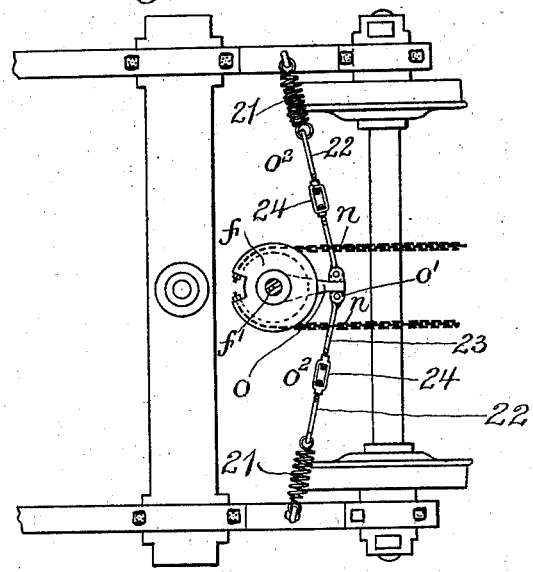

No. 743,449. PATENTED NOV. 10, 1903.
G. F. CHAPMAN.
HEADLIGHT OPERATING MECHANISM.
APPLICATION FILED FEB. 24, 1903.
NO MODEL. 3 SHEETS—SHEET 1.
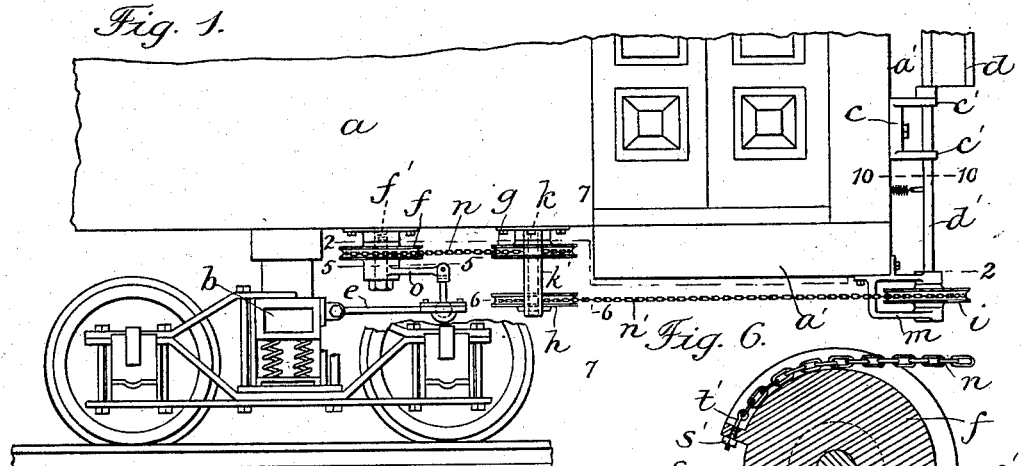
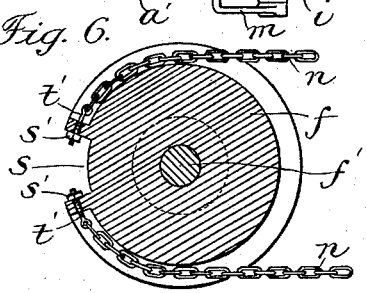
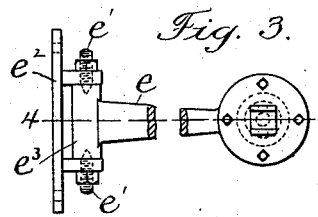
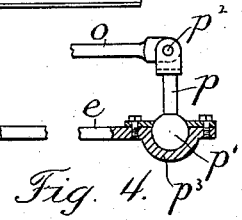
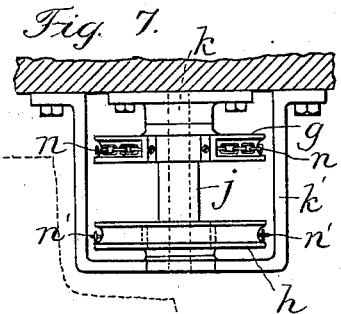
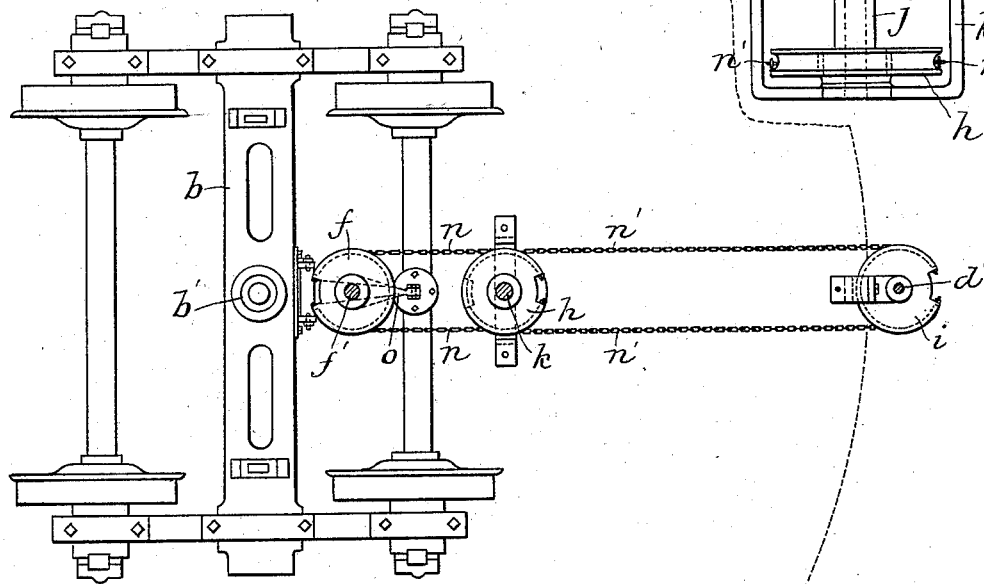
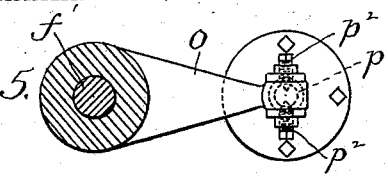
Witnesses:
P. W. Pezzetti
E. Batchelder
Inventor:
G. F. Chapman
by Knight Brown Quimby
attys.

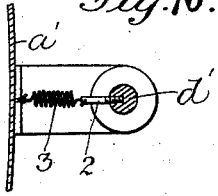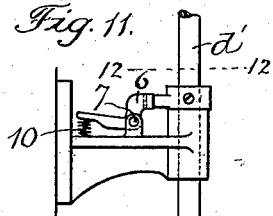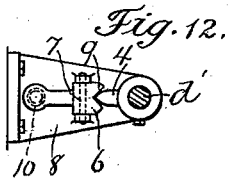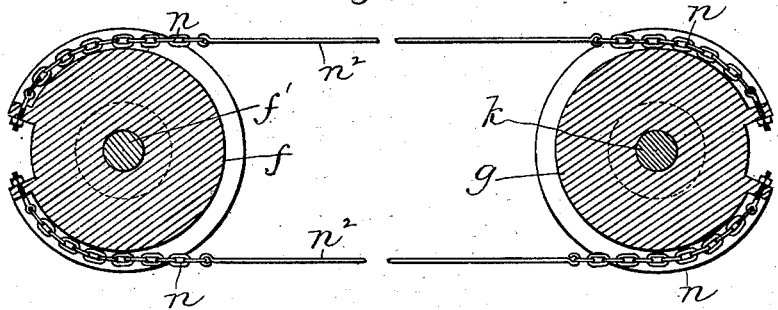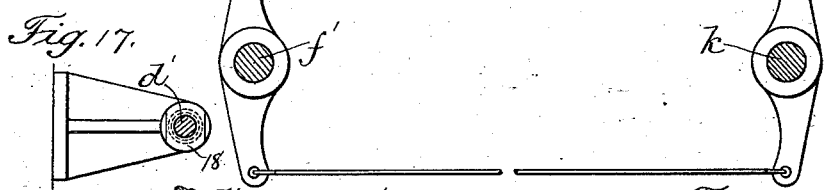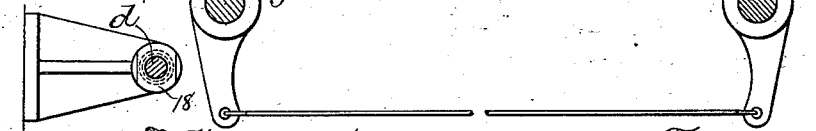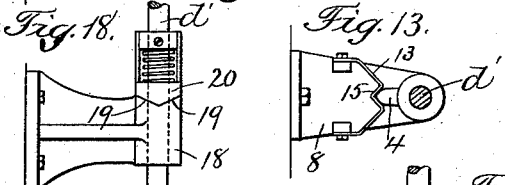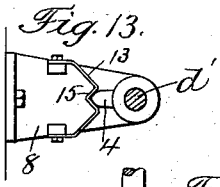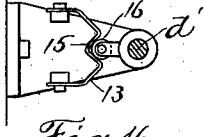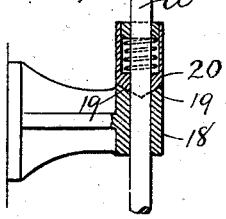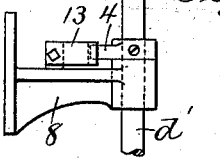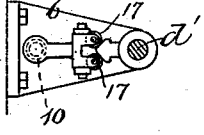

No. 743,449. PATENTED NOV. 10, 1903.
G. F. CHAPMAN.
HEADLIGHT OPERATING MECHANISM.
APPLICATION FILED FEB. 24, 1903.
NO MODEL. 3 SHEETS—SHEET 3.

Witnesses:
P. W. Pezzetti
E. Batchelder

Inventor:
G. F. Chapman
By Wright Brown & Quinby
Attys

No. 743,449. Patented November 10, 1903.

UNITED STATES PATENT OFFICE.

GEORGE F. CHAPMAN, OF MARLBORO, MASSACHUSETTS, ASSIGNOR, BY DIRECT AND MESNE ASSIGNMENTS, TO CHAPMAN HEADLIGHT ADJUSTER COMPANY, OF PORTLAND, MAINE, A CORPORATION OF MAINE.

HEADLIGHT-OPERATING MECHANISM.

SPECIFICATION forming part of Letters Patent No. 743,449, dated November 10, 1903.

Application filed February 24, 1903. Serial No. 144,591. (No model.)

*To all whom it may concern:*

Be it known that I, GEORGE F. CHAPMAN, of Marlboro, in the county of Middlesex and State of Massachusetts, have invented certain new and useful Improvements in Headlight-Operating Mechanism, of which the following is a specification.

This invention relates to means for connecting a pivoted headlight on a street-car or other vehicle with a portion of the running-gear of said vehicle, so that when the vehicle is running on a straight portion of track or roadway the rays from the headlight will be directed along a path in line with the longitudinal center of the vehicle, and therefore directly ahead of the same; but when the track or roadway is curved the rays from the headlight will be automatically deflected in the direction of the curvature, and thus caused to illuminate the curved path over which the vehicle is passing.

In Letters Patent of the United States No. 712,433, dated October 28, 1902, I have shown a headlight-operating mechanism of the class above indicated having for its object to provide connections between a headlight on a car-body and one of the truck-frames of the body, which connection will be compact and also out of the way of other appliances which may be located beneath the car.

The present invention has the same general objects in view, and, further, to provide connections adapted particularly for vestibule-cars in which the floor of the vestibule is located below the bottom of the body of the car, so that an offset is required in the connections between the truck-frame and the headlight-supporting shaft.

The invention also has for its object to enable the headlight to be automatically held yieldingly in a central position when running on a straight portion of the track to prevent the possibility of lateral deflection of the headlight due to imperfections in the connections between it and the truck-frame.

To these ends the invention consists in the improvements which I will now proceed to describe and claim.

Figure 20:
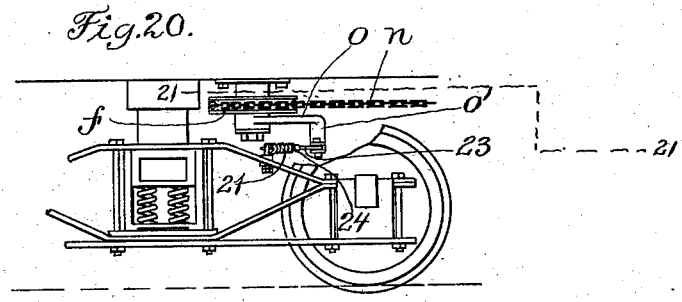

Of the accompanying drawings, forming a part of this specification, Figure 1 represents a side elevation of a portion of a vestibule-car provided with a headlight mechanism embodying my invention. Fig. 2 represents a section on line 2 2 of Fig. 1 and a plan view of the parts below said line. Fig. 3 represents a top plan view of the primary arm, which extends forward from the truck-frame, and the link connected with the outer end of said arm. Fig. 4 represents a section on line 4 4 of Fig. 3. Fig. 5 represents a section on line 5 5 of Fig. 1. Fig. 6 represents a section on line 6 6 of Fig. 1. Fig. 7 represents a section on line 7 7 of Fig. 1 and an elevation of parts at the left of said line. Fig. 8 represents a view similar to Fig. 6, with a duplication of the parts shown in said figure and illustrating a modification. Fig. 9 represents a view similar to Fig. 8, showing another modification. Fig. 10 represents a section on line 10 10 of Fig. 1, showing one form of means for yieldingly holding the headlight in a central position. Fig. 11 represents a side view of another form of means for the same purpose. Fig. 12 represents a section on line 12 12 of Fig. 11 and a plan view of the parts below said line. Figs. 13 to 19, inclusive, represent various modifications of means for yieldingly holding the headlight in central position. Fig. 20 represents a view similar to Fig. 1, showing a different means for imparting movement from the truck-frame. Fig. 21 represents a section on line 21 21 of Fig. 20 and a plan view of the parts below said line.

The same reference characters indicate the same parts in all the figures.

In the drawings and referring for the present to Figs. 1 to 19, inclusive, $a$ represents a portion of the body of a street-car, and $a'$ represents a portion of the front fender or dasher of the car, or $a'$ may be considered as representing the front wall of a vestibule at one end of the car-body.

$b$ represents an independently-movable part below the body $a$, said part being in this instance the bolster portion of the truck-frame, said portion being pivotally connected at $b'$ with the body $a$.

$c$ represents a holder which is affixed to the part $a'$ of the car-body and is here shown as a bracket having two ears or bearings $c'$ $c'$.

$d$ represents the headlight, which is secured to a vertical shaft $d'$, journaled in the ears or bearings $c'$ $c'$. The relative arrangement of the headlight $d$, shaft $d'$, and the car-body is such that the headlight can occupy a central position, so as to direct its rays ahead in line with the longitudinal center of the body or can be turned or deflected to direct its rays to either side of said longitudinal center.

In the embodiment of my invention now under consideration, as in that shown in the above-mentioned patent, the headlight is normally held in its central position and is automatically deflected from said position by changes in the position of the bolster $b$ through connections between the headlight and the bolster. Said connections comprise a primary arm $e$, connected with and projecting forward from a part of the truck, such as the bolster $b$, said primary arm being preferably hinged to the bolster in such manner that its outer end can swing in a vertical plane, the hinge connection being, preferably by means of center screws $e'$ $e'$, inserted in ears in a bracket $e^2$, affixed to the front side of the bolster and engaging sockets in the ends of a hub $e^3$, formed on the inner end of the primary arm $e$. The said connections also include horizontally-arranged rockers mounted to oscillate horizontally on vertical studs or bearings affixed to and projecting downwardly from the bottom of the car-body, there being in this embodiment of my invention one pair of rockers $f$ $g$, located above the level of the primary arm $e$ and in close proximity to the bottom of the main body of the car, and another pair of rockers $h$ $i$, located at a lower point and below the level of the bottom of the vestibule $a'$ of the car. The rocker $f$ is mounted to oscillate on a vertical stud or bearing $f'$, affixed to the bottom of the car. The rockers $g$ $h$ are connected rigidly by a sleeve $j$, said rockers and sleeve being mounted on a vertical stud or bearing $k$, affixed to the bottom of the car, the lower portion of said bearing $k$ being supported by a depending frame or bracket $k'$. The rocker $i$ is affixed to the lower end portion of the headlight-supporting shaft $d'$ and is located between the arms of a bracket $m$, affixed to the forward portion of the vestibule, said bracket having bearings for the lower end of the shaft $d'$.

Each of the described rockers projects in opposite directions from its vertical axis. The rockers $f$ and $g$ are connected by a pair of flexible connections, which are or may be chains $n$ $n$, each chain being attached at its ends to the two rockers, one chain being at one side of the axes of the two rockers and the other at the opposite side of said axes. The rockers $h$ and $i$ are connected similarly to the rockers $f$ and $g$ by flexible connections, such as chains $n'$.

To the hub of the rocker $f$ is affixed a horizontal arm $o$, which projects over the primary arm $e$ and is hereinafter referred to as the "secondary" arm. The primary and secondary arms $e$ and $o$ are connected by a vertical link $p$, having at its lower end a ball-shaped enlargement $p'$, engaged with a socket $p^3$ in the primary arm, the whole constituting a ball-and-socket connection between the arm $e$ and link $p$. The upper end of the link $p$ is connected with the secondary arm $o$ by means of horizontally-arranged center screws $p^2$ $p^2$, inserted in tapped orifices in ears formed on the upper end of the link $p$ and entering sockets formed for their reception in the sides of the outer end portion of the secondary arm $o$.

It will be seen that the turning movements of the car-truck cause the arm $e$ to swing horizontally. Said movement is imparted to the secondary arm $o$ through the link $p$, the arm $o$ being thus caused to turn the rocker $f$ horizontally in one direction or the other. This movement of the rocker $f$ is imparted to the rocker $g$ by the connections $n$ $n$ and from the rocker $g$ to the rocker $h$ through the sleeve $j$ and from the rocker $h$ to the rocker $i$ through the connections $n'$ $n'$. The rocker $i$ being rigidly fixed to the headlight-shaft $d'$, the latter is turned in its bearings and the headlight is correspondingly turned, the whole arrangement being such that the headlight is turned to throw the light along the curve of the track, which causes the above-mentioned turning movement of the truck-frame.

It will be seen that the above-described connections between the truck-frame and the headlight-shaft are simple and compact and are adapted especially to a vestibule-car, because the portion of the connections including the rockers $f$ $g$ is in a different vertical plane from that portion including the rockers $h$ $i$, the last-mentioned portion of the connections being thus offset or depressed to conform to the depression of the vestibule $a'$. The ball-and-socket connection between the link $p$ and primary arm $e$ and the horizontal hinge connection between the link $p$ and the secondary arm $o$, formed by the center screws $p^2$, enable the parts $e$, $p$, and $o$ to move freely and without binding under all conditions attending the movement of the car.

Each of the above-described rockers is preferably formed as a pulley, as shown in Figs. 2, 6, and 8, one side of the pulley being cut away or provided with a recess $s$, the end walls $s'$ $s'$ of which constitute faces which support nuts adjustably engaged with screw-threaded terminals $t$ $t$ at the ends of the connections between the rockers. Provision is thus made for adjusting or taking up the slack of said connections. When the rockers are made in the form last described, the portions of the connections that are attached to and bear directly upon the segmental surfaces of the rockers are necessarily flexible; but they are not necessarily flexible along their entire length. Fig. 8 shows inflexible sections $n^2 n^2$ interposed between the rockers $f$ and $g$.

In Fig. 9 I show a pair of rockers, each composed of two oppositely-projecting arms connected by practically inflexible rods jointed to the outer ends of the arms.

It will be seen that with the construction thus far described the headlight-shaft $d'$ is controlled wholly by connections between it and the truck-frame, so that if by reason of any imperfections in said connections the headlight is not held exactly in a central position thereby when the car is running on a straight track there is liability that the headlight will stand slightly out of its desired central position, and therefore project its light more or less to one side of a straight track. To obviate this objection and compensate for any imperfections in the connections due to wear or imperfect adjustment, I provide means for automatically and yieldingly holding the headlight in a central position, said means being of such nature that the headlight can be readily moved from said position in either direction by a turning movement of the truck-frame, as above described. The means for thus yieldingly holding the headlight may be variously modified, and in Figs. 10 to 19, inclusive, I have shown several different devices for accomplishing this end.

In Fig. 10 I show an arm 2 affixed to and projecting rearwardly from the headlight-shaft $d'$ and a spring 3 extending rearwardly from said arm to the dasher $a'$ or the front of the vestibule. The said spring and arm are arranged so that the tendency of the spring to contract normally holds the arm parallel with the length of the car, thus insuring the desired central position of the headlight.

In Figs. 11 an 12 I show the headlight-shaft $d'$ provided with a rearwardly-projecting arm 4, which is wedge-shaped at its outer end and is engaged by a spring-pressed lever 6, pivoted at 7 to a bracket 8, said lever having a V-shaped notch 9 formed to receive the outer end of the arm 4, as shown in Fig. 12. A spring 10 normally holds the notched end of the lever in engagement with the arm 4. When the lever 7 is held in its normal position by the spring 10, the sides of the notch 9 by their engagement with the arm 4 hold the shaft $d'$ in its desired predetermined position. When the shaft is turned from said position by a turning movement of the truck-frame, the pressure of the arm 4 against one of the sides of the notch 9 displaces the lever 7, which swings on its pivot in the direction required to compress the spring 10, the arm 4 moving outwardly along the side of the notch 9, against which it bears, without passing away from said side. When the shaft $d'$ is turned back to or toward its central position, the spring acting on the lever causes the side of the notch which bears on the arm 4 to exert pressure on the arm, tending to restore the arm to the position shown in Fig. 12.

In Fig. 13 I show the shaft $d'$ provided with the arm 4, above described, the bracket 8 being provided with a spring 13, which is bent at its central portion to form a recess 15, formed to engage the arm 4 and yieldingly return it to its predetermined position shown in Fig. 14.

Fig. 15 shows a construction similar to that shown in Figs. 13 and 14, excepting that the arm on the shaft $d'$ is provided with a trundle-roll 16.

Fig. 16 shows a construction similar to that shown in Figs. 11 and 12, excepting that the lever 7 is provided with rolls 17 17, engaging the inclined sides of the arm on the shaft $d'$.

Figs. 17, 18, and 19 show the shaft $d'$ journaled in a bracket 18, the upper end of which is recessed to form two faces 19 19, angularly arranged to form a V-shaped notch. To the shaft $d'$ is affixed a collar 20, having a V-shaped lower end, the faces of which are adapted to fit the faces 19 19 of the bracket 18. When the shaft $d'$ holds the headlight in its central position, the lower end of the collar 20 bears squarely upon the bracket-faces 19. When the shaft is turned from its central position, the apex of the lower end of the collar 20 rides upwardly on the inclined faces 19 19, the shaft $d'$ being thus slightly elevated. When the shaft is moved back toward its central position, the apex of the lower end of the collar 20 will find its seat in the recessed upper end of the bracket 18.

In Figs. 20 and 21 I show instead of the primary arm $e$ a different (and the preferred) means for connecting the truck-frame with the intermediate mechanism. Said means include the arm $o$, which in this embodiment of the invention is extended downwardly at $o'$, and links $o^2 o^2$, connecting the lower portion of the arm with points $o^3 o^3$ at opposite ends of the truck-frame, said links extending outwardly from the arm in substantially opposite directions. Each link is preferably composed of two general parts, one of which is a spring 21, attached at one end to the truck-frame, while the other is composed of rods 22 23, adjustably connected by a turnbuckle 24, the rod 22 being connected with the spring and the rod 23 with the arm $o$.

The turning movements of the truck-frame are imparted to the arm $o$ through the said links, with the same result as that above described. The links are, however, more desirable than the primary arm $e$, because of their elasticity, due to the springs 21, and their adjustability, due to the turnbuckles 24.

In Letters Patent of the United States No. 717,076, dated December 30, 1902, I have shown a pair of arms mounted to swing in vertical axes on the bottom of the car-body, said arms being independently mounted and independently connected with the truck-frame and arranged so that each swings in a path extending lengthwise of the car-body. In the present invention I substitute for the two independently-mounted and connected arms a single arm, which is movable in a path extending crosswise of the car-body. The construction is thus simplified and the single arm is enabled to impart motion in both directions to the headlight-supporting shaft through the intermediate mechanism.

I claim—

1. The combination with a truck-frame and a car-body, of a headlight mechanism comprising a single arm mounted to oscillate on a vertical axis affixed to the car-body and movable in a path which extends crosswise of the car-body, means for communicating motion from the truck-frame to said arm, a vertical headlight-supporting shaft journaled in bearings on the forward portion of the car-body, and connections between the arm and the headlight-shaft, whereby lateral movements of the arm are caused to turn the shaft and the headlight thereon.

2. The combination with a truck-frame and a car-body, of a headlight mechanism comprising an arm mounted to oscillate on a vertical axis affixed to the car-body, means for communicating motion from the truck-frame to said arm, a vertical headlight-supporting shaft journaled in bearings on the forward portion of the body, the lower end of said shaft extending below the bottom of the forward portion of the car-body and below the arm, and offset connections between the arm and the lower end portion of the headlight-shaft.

3. The combination with a truck-frame and a car-body, of a headlight mechanism comprising an arm mounted to oscillate on a vertical axis affixed to the car-body, means for communicating motion from the truck-frame to said arm, a vertical headlight-supporting shaft journaled in bearings on the forward portion of the car-body, the lower end of said shaft extending below the bottom of the forward portion of the car-body and below the arm and having a rocker, another rocker affixed to the arm, two rigidly-connected intermediate rockers located at different heights between the arm and the headlight-shaft, the upper intermediate rocker coinciding with the rocker on the arm, while the lower intermediate rocker coincides with the rocker on the headlight-shaft, connections between the rocker on the arm and the upper intermediate rocker, and connections between the lower intermediate rocker and the rocker on the headlight-shaft.

4. The combination with a truck-frame and a car-body, of a headlight mechanism comprising an arm mounted to oscillate on a vertical axis on the car-body, means for communicating motion from the truck-frame to said arm, a vertical headlight-supporting shaft journaled in bearings on the forward portion of the car-body, and connections between said arm and the headlight-shaft, said connections comprising a plurality of pairs of pulley-shaped rockers having recesses interrupting their peripheries, each recess having two end faces, and two flexible connections between the rockers of each pair, said connections being located at opposite sides of the axes of the connected rockers, each connection having a screw-threaded terminal extending through one of said end faces and secured by a nut bearing on said face.

5. The combination with a truck-frame and a car-body, of a headlight mechanism comprising an arm mounted to oscillate on a vertical axis on the car-body, means for communicating motion from the truck-frame to said arm, a vertical headlight-supporting shaft journaled in bearings on the forward portion of the car-body, and connections between said arm and the headlight-shaft, said connections comprising a pair of rockers mounted to oscillate horizontally, and two connecting devices extending horizontally between said rockers, said devices being at opposite sides of the axes of the rockers.

6. The combination with a truck-frame and a car-body, of a headlight mechanism comprising an arm mounted to oscillate on a vertical axis on the car-body, means for communicating motion from the truck-frame to said arm, a vertical headlight-supporting shaft journaled in bearings on the forward portion of the car-body, and connections between said arm and the headlight-shaft, said connections comprising two pairs of horizontally-movable rockers and two connecting devices extending between the rockers of each pair, one pair of rockers being located above the other, one member of the upper pair of rockers being rigidly connected to a member of the lower pair, while the other member of the lower pair is attached to the headlight-shaft.

7. The combination with a truck-frame and a car-body, of a headlight mechanism comprising an arm mounted to rock or oscillate on the car-body, oppositely-extending links connecting said arm with points at opposite sides of the center of movement of the truck-frame, a vertical headlight-supporting shaft journaled in bearings on the forward portion of the car-body, and connections between the arm and headlight-shaft, whereby movements of the arm are caused to turn the shaft and headlight.

8. The combination with a truck-frame and a car-body, of a headlight mechanism comprising an arm mounted to rock or oscillate on the car-body, oppositely-extending links connecting said arm with points at opposite sides of the center of movement of the truck-frame, said links having elastic sections, a vertical headlight-supporting shaft journaled in bearings on the forward portion of the car-body, and connections between the arm and headlight-shaft.

9. The combination with a truck-frame and a car-body, of a headlight mechanism comprising an arm mounted to rock or oscillate on the car-body, oppositely-extending links connecting said arm with points at opposite sides of the center of movement of the truck-frame, said links being longitudinally adjustable, a vertical headlight-supporting shaft journaled in bearings on the forward portion of the car-body, and connections between the arm and headlight-shaft.

10. The combination with a truck-frame and a car-body, of a headlight mechanism comprising a vertical headlight-supporting shaft, connections between the shaft and the truck-frame, whereby turning movements of the truck-frame are imparted to said shaft, and automatic means for yieldingly holding the shaft with the headlight in a central position to compensate for imperfections in the said connections.

In testimony whereof I have affixed my signature in presence of two witnesses.

GEORGE F. CHAPMAN.

Witnesses:
R. M. PIERSON,
E. BATCHELDER.